United States Patent [19]

Platz

[11] Patent Number: 5,653,255
[45] Date of Patent: Aug. 5, 1997

[54] SEWAGE TREATMENT SYSTEM

[75] Inventor: Winfried Platz, Hyannis, Mass.

[73] Assignee: Stormtreat Systems, Inc., Hyannis, Mass.

[21] Appl. No.: 524,717

[22] Filed: Sep. 7, 1995

[51] Int. Cl.⁶ .................... F16K 7/06; F16K 31/12; F16L 55/10
[52] U.S. Cl. ............. 137/391; 137/112; 137/119.01; 137/256; 137/403; 137/426; 137/595; 251/6; 251/9
[58] Field of Search ................ 137/391, 595, 137/256, 121, 112, 119.01, 403, 426; 251/6, 7; 141/198; 210/104, 532.2

[56] References Cited

U.S. PATENT DOCUMENTS

| | | | |
|---|---|---|---|
| 565,465 | 8/1896 | Kruse | 137/256 |
| 714,801 | 12/1902 | Killon | 137/256 |
| 732,208 | 6/1903 | Mitchell | 210/253 |
| 940,402 | 11/1909 | Patterson | 137/256 |
| 1,573,929 | 2/1926 | Gall | 210/301 |
| 1,902,171 | 3/1933 | Kopp . | |
| 2,542,855 | 2/1951 | Willison | 137/256 |
| 2,557,438 | 6/1951 | Johnson | 137/256 |
| 2,779,351 | 1/1957 | Levine | 137/256 |
| 2,779,476 | 1/1957 | Barker | 137/256 |
| 2,780,231 | 2/1957 | Westmoreland | 137/121 |
| 3,606,907 | 9/1971 | Stenberg | 137/112 |
| 3,754,768 | 8/1973 | Ellis et al. | 251/6 |
| 3,770,623 | 11/1973 | Seidel | 210/170 |
| 3,817,864 | 6/1974 | Carlson et al. | 210/532.2 |
| 3,860,028 | 1/1975 | Moore et al. | 137/391 |
| 4,132,645 | 1/1979 | Bottomley et al. | 210/104 |
| 4,162,976 | 7/1979 | Monson | 210/170 |
| 4,293,421 | 10/1981 | Green | 210/532.2 |
| 4,372,345 | 2/1983 | Mehus | 251/6 |
| 4,824,572 | 4/1989 | Scott | 210/602 |
| 4,839,051 | 6/1989 | Higa | 210/602 |
| 4,995,969 | 2/1991 | LaVigne | 210/150 |
| 4,997,568 | 3/1991 | Vandervelde et al. | 210/170 |
| 5,073,257 | 12/1991 | Higa | 210/170 |
| 5,137,565 | 8/1992 | Wolverton | 210/195 |
| 5,174,897 | 12/1992 | Wengrzynek | 210/602 |

FOREIGN PATENT DOCUMENTS

| | | | |
|---|---|---|---|
| 8046/32 | 11/1931 | Australia | 137/256 |
| 608718 | 12/1925 | France | 137/256 |
| 647163 | 6/1927 | France | 137/256 |
| 58-70890 | 2/1983 | Japan . | |

*Primary Examiner*—Denise L. Ferensic
*Assistant Examiner*—Joanne Y. Kim
*Attorney, Agent, or Firm*—Lahive & Cockfield

[57] ABSTRACT

A sewage treatment system includes a pair of substantially identical unitary fluid treatment modules, each module having a central sedimentation tank surrounded by a peripheral wetland. The sedimentation tanks are coupled through a dosing device to an input source of sewage and, as an outlet, to a leaching field. The dosing device includes a switching mechanism isolated from the fluids, which mechanism provides in one cycle for one treatment module to be filled with the incoming sewage while maintaining its outlet closed. When the liquid level in the sedimentation tank in the first treatment module reaches a predetermined level the dosing device switches the sewage input to the other treatment module, while opening the outlet from the first treatment module to the leaching field. The dosing device switching mechanism employs pinch valves arranged so that when the inlet on one treatment module is closed, the inlet on the other treatment module is substantially simultaneously opened. Similarly, when one sedimentation tank outlet module is opened, the outlet module from the sedimentation tank in the other treatment is substantially simultaneously closed. The switching mechanism is actuated in response to sensed liquid levels in the sedimentation tanks in the two treatment modules.

11 Claims, 4 Drawing Sheets

α ⟹ 1/2 ANGLE SWITCHING LEVER
>α ⟹ LAG IN SWITCHING TO ENSURE QUICK ACTION OF LEVER
SPRING ASSISTED

SEWAGE TREATMENT SYSTEM

BACKGROUND OF THE INVENTION

This invention relates in general to a septic treatment system and more particularly to a treatment system including first and second treatment modules, each including a sedimentation tank and a dosing device interconnecting first and second treatment modules, the dosing device providing an automatic mechanism for switching a sewage input from said first treatment module to said second treatment module and vice versa depending upon the liquid level within the respective sedimentation tank. With the advent of more stringent ground water controls efficient, effective treatment of sewage fluids which can reduce the area for leaching fields has become imperative. A variety of approaches has been employed for such a treatment.

The traditional modem system includes a holding tank, a distribution box and perforated pipes forming a leaching field in which solids are allowed to decay in the holding tank while effluent liquids spread through the leaching fields and are filtered by means of gravel and soil before returning to the ground water system. Other variants on this have included a water system employing use of aquatic plants to clear the liquid running through the system of soluble materials. Systems of this type are described in U.S. Pat. Nos. 1,902,171; 4,824,572; 4,995,969 and 5,073,257. Drawbacks of both of the above systems include the mount of area required for leaching field or the aquatic plant water system, even in soils which exhibit rapid percolation rates. Additionally, while the individual components of such systems are usually mass produced, the individual systems are laid out with a number of these individual components connected together including, for example, the aforementioned holding tanks, distribution boxes and leaching field elements which are economically inefficient since they require a relatively high amount of labor to lay out and install.

It is therefore an object of the present invention to provide a modularized efficient system for treatment of sewage which can return water to the ground at relatively highly purified condition and which is operated without external power and employs a leaching field small compared to the size of the leaching fields in conventional systems.

SUMMARY OF THE INVENTION

Broadly speaking in the present invention a pair of septic treatment modules, each including a sedimentation tank and a peripheral wetland integrated into a single module are interconnected by a dosing device for alternately allowing liquid to flow to one treatment module, while simultaneously allowing liquid to flow out of the other treatment module, and in which the modules are interconnected in the opposite way when the liquid level in the sedimentation tank of the treatment module open at its inlet reaches a predetermined level. The dosing device switching mechanism is entirely mechanical and the sewage and liquids passing through the dosing device are entirely contained within inert tubing. The switching is accomplished by operation of a mechanical linkage to compress sections of the flexible wall tubing, which therefore serve as pinch valves.

DESCRIPTION OF THE DRAWING

In the drawings:

With reference now to the drawings, FIG. 1 is an illustration in generally diagrammatic form of a preferred embodiment of a sewage treatment system constructed in accordance with the principles of this invention. The system includes a pair of substantially identical unitary septic treatment modules 15 and 17, generally as described in U.S. Pat. No. 5,437,786, which is incorporated herein by reference. Each of these modules consists of a central sedimentation tank and a peripheral wetland, constructed of a single polymer material. The treatment modules are interconnected through a dosing device 13 which includes an inlet port 19 from the source of sewage, and an outlet port 21 to a leaching field. The dosing device 13 is also connected to septic treatment module 17 through the dosing device outlet port 18 and to septic treatment module 15 through the outlet port 16 from the dosing device 13. An outlet 20 from treatment module 17 is connected as an input to dosing device 13 and outlet 22 from treatment module 15 is also connected as a separate input to dosing device 13.

Figure 1:
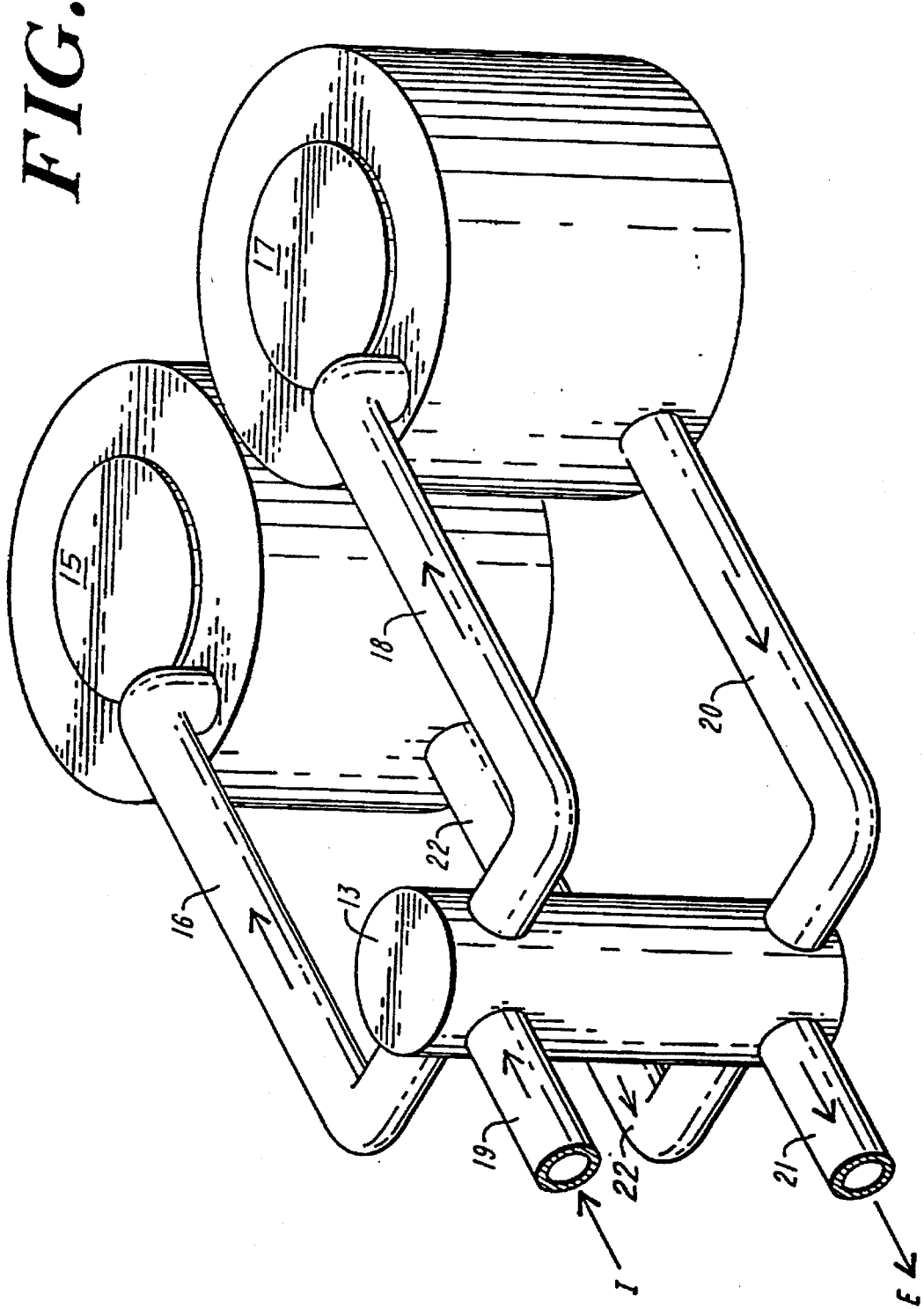
FIG. 1 is an illustration generally in diagrammatic form of a septic treatment system constructed in accordance with the principles of this invention.

The operation of this system illustrated in FIG. 1 is one where incoming sewage is transmitted to the dosing device 13, which in one cycle, provides sewage input through open port 16 to treatment module 15, while the output connection 22 from treatment module 15 is closed. At the same time the input connection 18 to treatment module 17 is closed, while outlet connection 20 from treatment module 17 to dosing device 13 is open. The dosing device 13 then provides a situation in which the input sewage material is provided first to one treatment module, the output of which is closed and the input of which is open, while the opposite is true at the other treatment module, namely, the inlet is closed and the outlet is open so that fluids from the second treatment module are provided through port 21 as an output to the leaching field. As will be explained in detail, the dosing device is arranged to switch this situation when the treatment module 15 receiving the input sewage has a predetermined liquid level reached within it, so that it becomes the outflow module, while the other treatment module 17 then accepts the input sewage, while closing off its output to dosing device 13 and thence to the leaching field.

Figure 2:
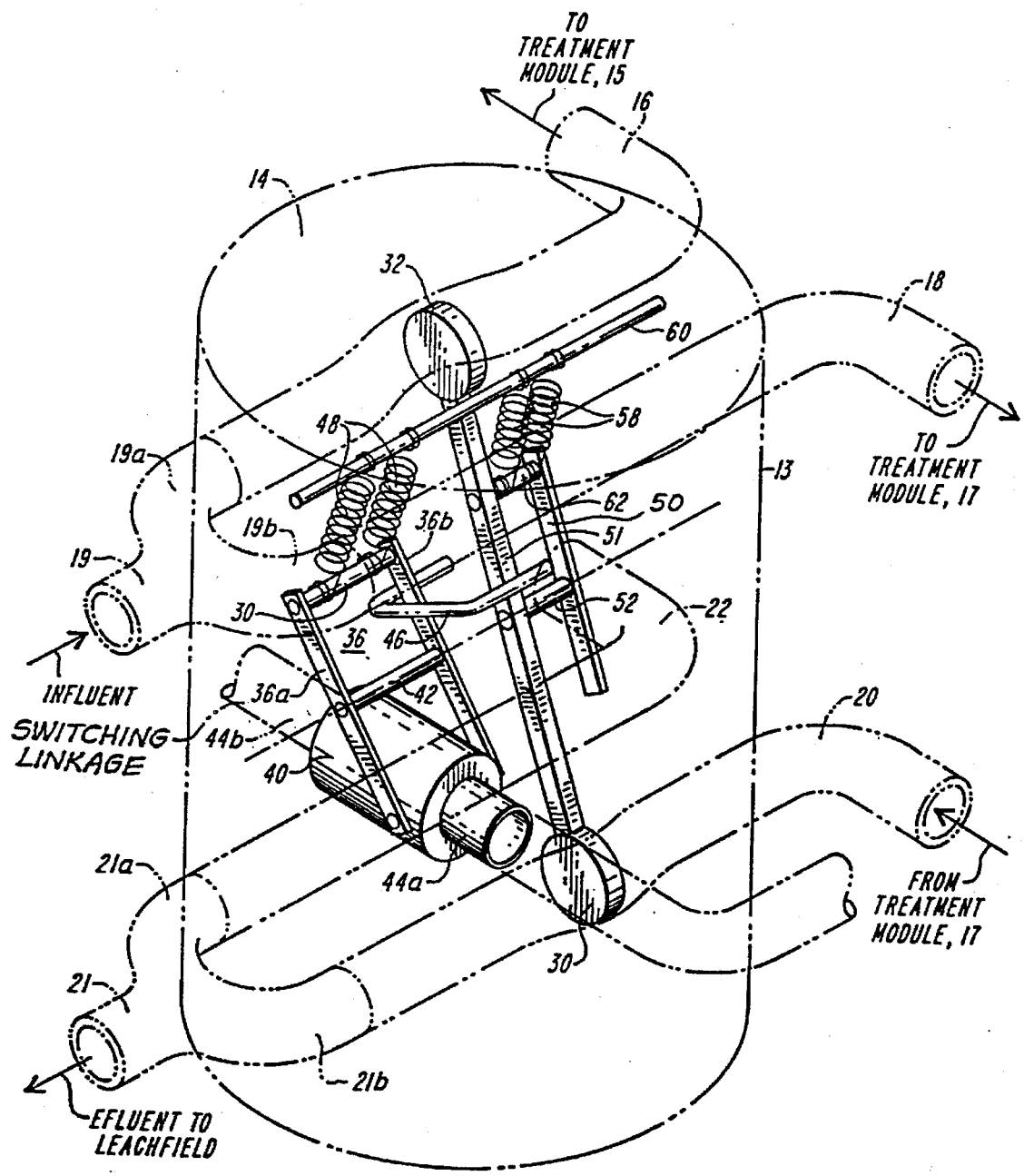
FIG. 2 is an illustration in perspective view of a dosing device of a system of FIG. 1.
Figure 2A:
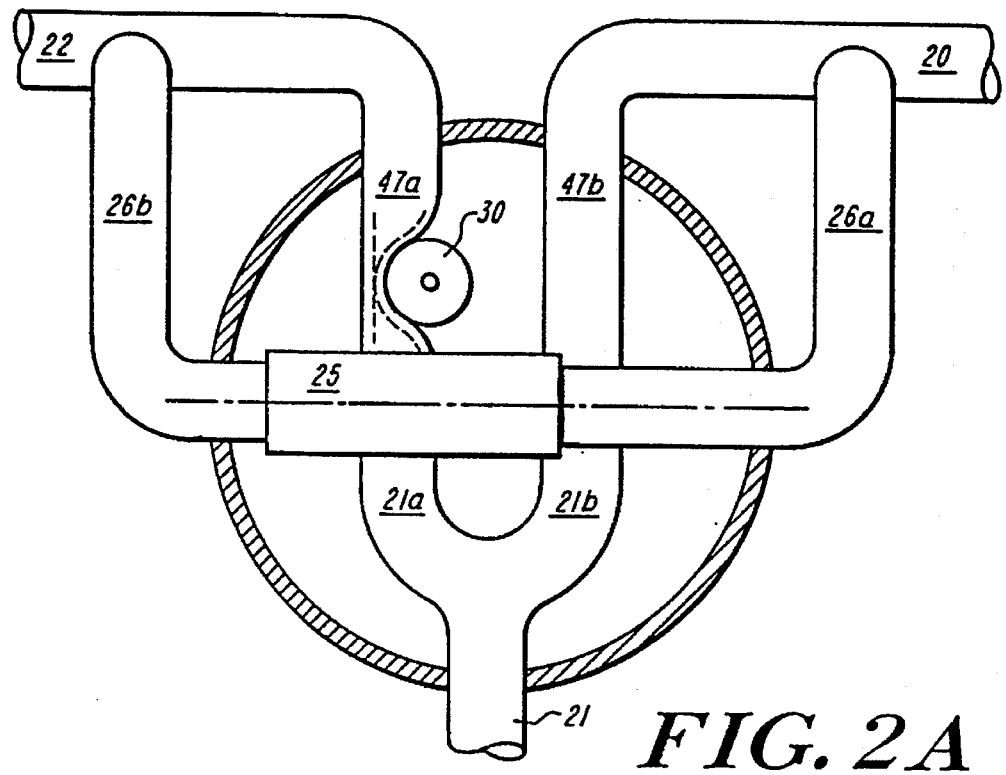
FIG. 2A is a plan view of the lower portion of the dosing device of FIG. 2.

FIG. 2 is a perspective view of the dosing device 13 illustrated in FIG. 1, while FIG. 2a is a view of the lower tubing elements and the pressure sensor illustrated in FIG. 2.

The dosing device 13 is formed with a generally cylindrical housing 14 having an inlet port 19 from the source of sewage and outlet port 21 providing effluent to the leaching field. The inlet port 19 is bifurcated into a pair of tubes 19a and 19b, 19a running through flexible tubing 49a to an outlet port 16 connected as a inlet to treatment module 15, while connecting tube 19b is connected through flexible tubing 49b. to dosing device outlet port 18 which connected as an input to septic treatment module 17. The dosing device outlet port 21 is also bifurcated, one connecting tube 21a running through tubing 47a to a connection 22 to the outlet from septic treatment module 15, while the other dosing device outlet tube 21b is connected to the outlet connection 20 from septic treatment module 17.

The dosing device 13 is a switching arrangement which provides that in one switch position one septic treatment module 15 has a closed inlet and an open outlet while, the second treatment module 17 has an open inlet with a closed outlet. In the other switch position the opposite is true, namely that the treatment module 15 now has an open inlet and a closed outlet while the treatment module 17 now has a closed inlet and open outlet. Switching action is controlled by the liquid level inside the treatment modules. Thus if, for example, treatment module 15 was in the position with an open inlet and a closed outlet and the liquid level built up inside it to a predetermined level, then switching would be actuated to close the treatment module 15 input connection and open its output connection thereby releasing the fluid in it to the leaching field. The switching arrangement is such that when this switching occurs, substantially simultaneously the other treatment module 17, which previously was in the position of having a closed inlet connection and an open outlet connection is now provided with an open inlet connection and a closed outlet connection. Treatment module 17 therefore becomes the recipient of the input sewage until the level inside its sedimentation tank is at the predetermined level when the reverse switching occurs. In a normal septic arrangement the period of time between switching would typically be three to six days. The switching mechanism, which is contained within the dosing device 13, is entirely mechanically actuated and the opening and closing of the tubing connections between the dosing device inlet and output ports and the inlet and outlet ports of the septic treatment modules is accomplished by pinch valves which interact only with the exterior of the connecting tubes, which tubes are carrying sewage on the one hand or the treated effluent from the treatment modules on the other hand.

It is important, because of the way this dosing device is constructed, that the pinch valves operate simultaneously, that is, when a pinch valve closing off one tubing releases that tubing the valve substantially simultaneously engages the tubing connecting to the other treatment module so that when one opens the other closes at substantially the same time. Similarly it is important that the outlet valves are open and closed in synchronism with the inlet valves such that there is a minimum transition time between the opening and closing of the inlet connections to treatment modules. Similarly there should be substantially no lag between the opening of the outlet valve in one module and the closing of the outlet valve in the other module.

The mechanism for accomplishing this switching of the valve openings and closings is illustrated in FIGS. 2 through 6. As illustrated in those figures, the valves are formed of a flexible silicone or polyethylene tubes 47a, 47b, 49a and 49b, which are compressed in the lower set of tubes by cam 30 and in the upper set of tubes by cam 32. Cams 30 and 32 are cylindrical solid elements formed of a sufficiently hard material, such as stainless steel, ceramic or a suitable hard polymer. They are rotatably mounted on opposite ends of a bar 51 which is pivotally mounted on valve pivot bar 52 mounted horizontally within the housing 14 and in fixed mechanical position with respect to the wall of that housing. In one rotational position the valve cams 30 and 32 compress the tubing 49a, 49b and 47a, 47b connecting inlet and outlet ports 19 and 21 of the dosing device to opposite septic treatment modules so that the inlet to a first one of the septic treatment modules is closed, while the outlet from the other septic treatment module is closed. When the bar 51 rotates about the pivot bar 52 in the opposite direction, then the opposite effect occurs, namely, the inlet tube to the other treatment module is closed, as is also the outlet tube from the first treatment module.

Figure 3:
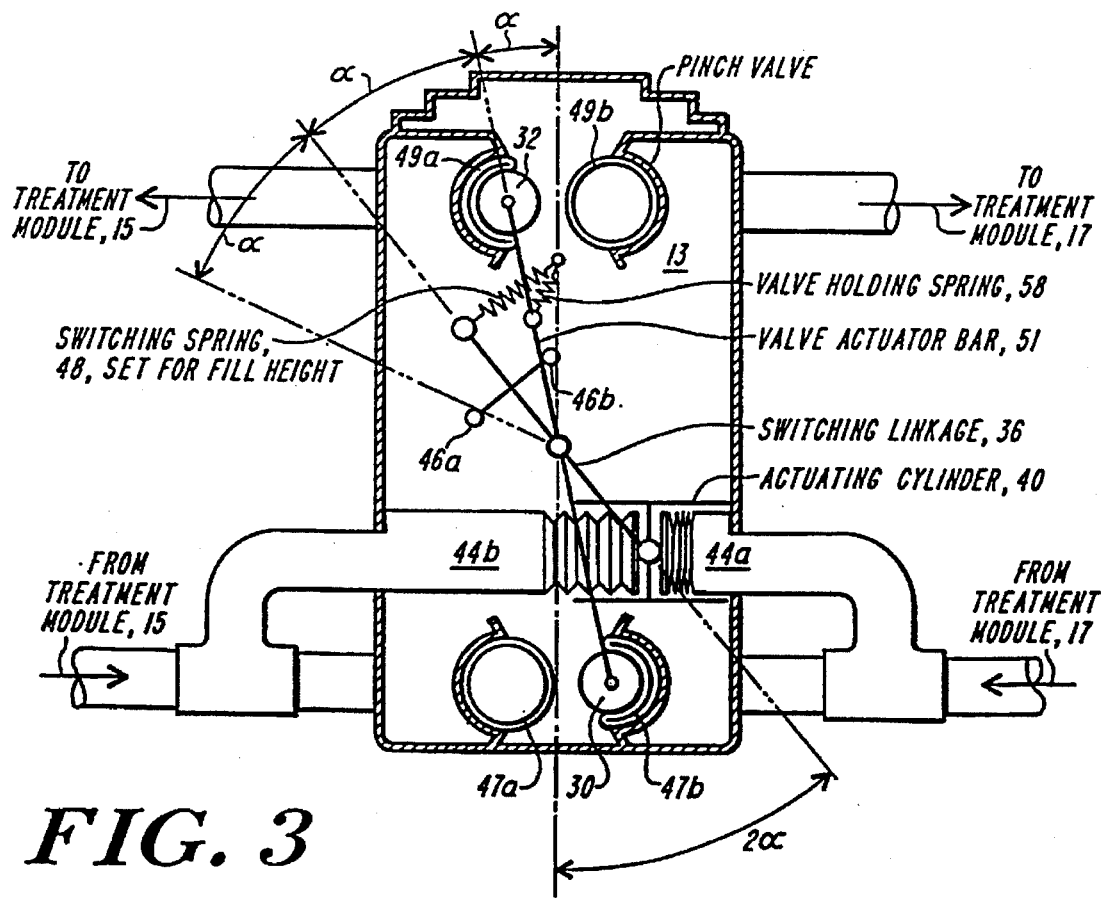
FIG. 3 is an illustration in side view of the dosing device of FIG. 2.

The mechanism to accomplish the rotation of this linkage bar includes a pressure sensor 25 which is formed of a cylinder sleeve 40 which slides back and forth in response to the expansion or contraction of pressure bellows 44a and 44b. When the liquid level in, for example, the treatment module 17 rises above a predetermined level the pressure in outlet tube 20 is carded through tubing 26a to expand bellows 44a thereby driving the cylinder sleeve 40 in one direction, while, as illustrated in FIG. 3 when the pressure from the liquid level in treatment module 15 is increased it expands bellows 44b driving the cylinder sleeve 40 in the opposite direction. Cylinder sleeve 40 has pivotally mounted on it a switching linkage assembly 36 consisting of a pair of lever arms 36a and 36b rotatably mounted on a second pivot bar 42 also mounted in a fixed position with respect to the casing 14 of the dosing device. The upper ends of the lever arms 36a and 36b are connected by a connecting bar 30. A U-shaped bar 46 is attached to linkage arm 36b providing horizontally extending horns 46a and 46b which extend beyond linkage bar 51 so that when the subassembly 36 rotates in the counterclockwise direction horn 46a causes linkage bar 51 to rotate in that same direction. Similarly, when subassembly 36 rotates in a clockwise direction horn 46b travels toward and eventually engages valve actuating bar 51 to rotate that bar also in the clockwise direction.

In order for this mechanism to work properly, switching linkage subassembly 36 should stay at one limit of its position until the cylinder sleeve 40 is driven along the length of its axis so that the subassembly 36 can pivot all the way to the other limit of its position. This is accomplished by means of switching springs 48 which serve to maintain the subassembly 36 in one position or the other, making it a specific "snap" action move from one position to the other. Because of the spacing between the horns 46a and 46b of the limit bar 46, the linkage bar 51 is not driven to change position until the subassembly 36 is driven almost completely to its final limit in one direction or the other. Springs 48 are attached at one end to the bar 30 and at the other end to a fixed retention bar 60. The springs 48 can be adjusted and by setting the compression on these springs the liquid level at which the linkage bar 51 is toggled from one position to the other can be controlled.

Attached to the spring retention bar 60 is a second set of springs 58 attached at their other end to a cross member 62 attached to the upper portion of the linkage bar 51. The valve holding springs 58 are compression springs which maintain the valve linkage bar 51 in one position or the other, that is, it toggles so that it does not have any rest position between the two limits of its rotation and keeps the valve cams 30 and 32 in position until snap action is initiated.

With the above described arrangement, then, as illustrated in FIG. 3, switching linkage element passes through an angle α before it engages switching linkage bar 51, which it then drives through a second angle α for initiating the change of position of the valve actuator 51 in one valve position to the other. Thus, the linkage assembly 36 moves through an angle of two α to generate a motion of the valve linkage bar 51 through an angle of α.

Figure 4:
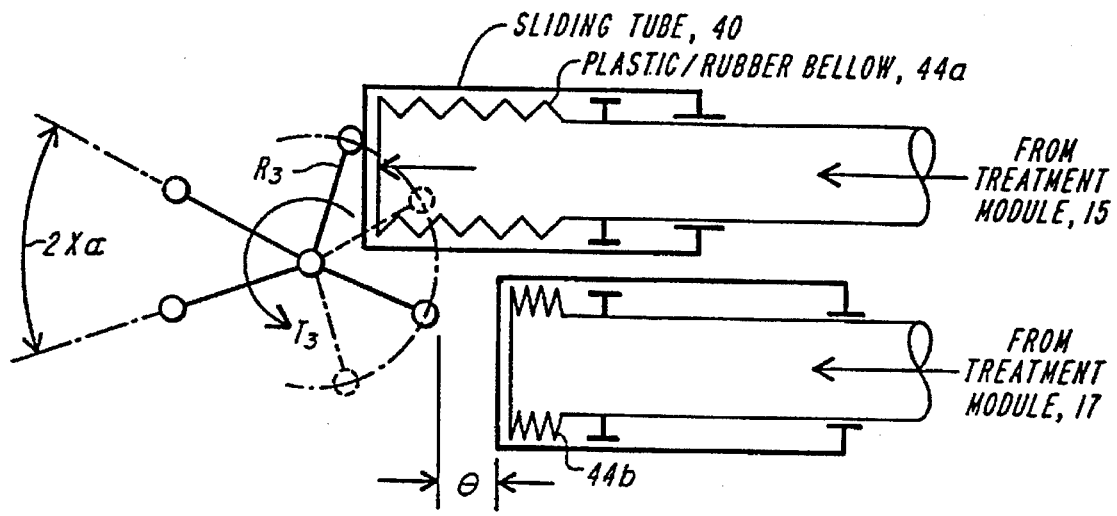
FIG. 4 is an illustration in diagrammatic form of a pressure sensor employed in the dosing device of FIG. 2.

FIG. 4 is a cross sectional detail of the elements of the actuator 40 for the sensor device 25. The bellows 44a and 44b may be formed of plastic or rubber. In general suitable pressures from the treatment modules are in the order of 1.5 psi, assuming a 4" diameter cylinder.

Figure 5:
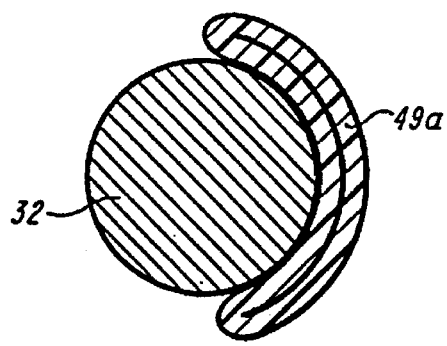
FIG. 5 is a cross sectional view of the action of one of the pinch valves included in the device of FIG. 2.

FIG. 5 is a cross sectional view of cam 32 compressing tubing 49a.

Figure 6:
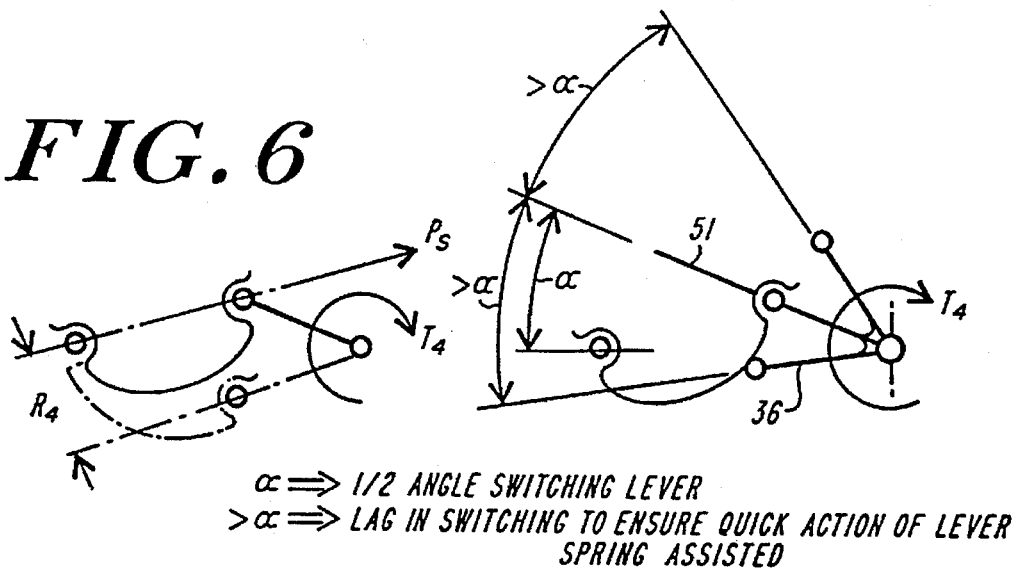
FIG. 6 is a diagrammatic illustration of the operation of the switching linkage shown in FIG. 2.

FIG. 6 shows diagrammatically the effect of the spring assisted switching action.

While a specific embodiment has been illustrated, it will be understood that other specific components and arrangements may be employed provided they perform the same functions.

What is claimed is:

1. A dosing device for a septic treatment system, which includes first and second unitary treatment modules, each module having a sedimentation tank with an inlet for receiving fluids, an outlet for discharging fluids, and a wetland integrated into said module and fluidically coupled to said sedimentation tank, said dosing device comprising, first, second and third inlet ports and first, second and third outlet ports, said first inlet port being fluidically connected to said first and second outlet ports, said second and third inlet ports being fluidically coupled to said third outlet port, said first outlet port being fluidically coupled to said inlet of a first one of said sedimentation tanks and said second outlet port being fluidically coupled to said inlet of a second one of said sedimentation tanks, said second inlet port being fluidically coupled to the outlet of said first one of said sedimentation tanks and said third inlet port being fluidically coupled to the outlet of said second one of said sedimentation tanks, said first inlet port being adapted for connection to a source of sewage and said third outlet port being adapted for connection to a leaching field, a valve mechanism adapted to move from a first position to a second position and from said second position back to said first position, a liquid level sensor providing an output signal indicative of the liquid level in each of said sedimentation tanks, said valve mechanism moving from said first to said second position when the liquid level in said first one of said sedimentation tanks is not less than reaches a predetermined level, and moving from said second position to said first position when the liquid level in said second one of said sedimentation tanks is not less than reaches a predetermined level, said valve mechanism in said first position providing a flow communication to one of said sedimentation tanks when first outlet port is open, said second outlet port is closed, said second inlet port is closed and said third inlet port is open, said valve mechanism in said second position providing a flow communication to the other one of said sedimentation tanks when said first outlet port is closed, said second outlet port is open, said second inlet port is open and said third inlet port is closed.

2. A dosing device for a septic treatment system, which includes first and second unitary treatment modules, each module having a sedimentation tank with an inlet for receiving fluids, an outlet for discharging fluids, and a wetland integrated into said module and fluidically coupled to said sedimentation tank, said dosing device comprising, first, second and third inlet ports and first, second and third outlet ports said first inlet port being fluidically connected to said first and second outlet ports by a first pair of separate flexible wall tubes, said second and third inlet ports being fluidically coupled to said third outlet port by means of a second pair of separate flexible wall tubes, said first outlet port being fluidically coupled to said inlet of a first one of said sedimentation tanks and said second outlet port being fluidically coupled to said inlet of a second one of said sedimentation tanks, said second inlet port being fluidically coupled to the outlet of said first one of said sedimentation tanks and said third inlet port being fluidically coupled to the outlet of said second one of said sedimentation tanks, said first inlet port being adapted for connection to a source of sewage and said third outlet port being adapted for connection to a leaching field, a valve mechanism adapted to move from a first position to a second position and from said second position back to said first position, a liquid level sensor providing an output signal indicative of the liquid level in each of said sedimentation tanks, said valve mechanism moving from said first to said second position when the liquid level in said first one of said sedimentation tanks is not less than a predetermined level, and from said second to said first position when the liquid level in said second one of said sedimentation tanks is not less than a predetermined level, said valve mechanism selectively opening and deforming in said first position providing said first pair of separate flexible wall tubes said first outlet port is open, said second outlet port is closed, said second inlet port is closed and said third inlet port is open, said valve mechanism in said second position providing second pair of separate flexible wall tubes said first outlet port is closed, said second outlet port is open, said second inlet port is open and said third inlet port is closed.

3. A dosing device as in claim 2 wherein said valve mechanism includes cams for pinching said flexible wall tubes to close the ports to which said tubes are connected.

4. A device in accordance with claim 1 wherein said valve mechanism includes a mechanical switching linkage comprising, a first linkage bar having first and second ends, which bar in a first position substantially simultaneously closes said first outlet port and opens said second outlet port and in a second position substantially simultaneously closes said second outlet port and opens said first outlet port.

5. A device in accordance with claim 4 wherein said mechanical switching linkage comprises, a second linkage element having first and second ends and being pivoted at a point intermediate said first and second ends allowing said second linkage element to move into a first position when said element is rotated in one direction and into a second position when said element is rotated in the opposite direction, said second linkage element being positioned so that one end provides force against said first linkage bar to rotate said first linkage bar into said first position when said second linkage element is rotated a predetermined distance in one direction and into a said second position when said second linkage element is rotated a predetermined distance in the opposite direction, said sensor means acting to rotate said second linkage element in one direction when the liquid level in said first sedimentation tank exceeds a preselected level and in the opposite direction when the liquid level in said second sedimentation tank exceeds a preselected level, and first spring means attached to said first linkage bar second end for moving said first linkage bar from said first to said second position and from said second to said first position, and holding said first linkage bar in first or second position, while said second linkage bar is preloaded for moving, second spring means attached to said second linkage bar being preloaded by the fluid actuated cylinder for the next movement.

6. Apparatus in accordance with claim 5 wherein said pressure sensor comprises a fluid actuated cylinder which travels in one direction in response to liquid pressure from said first sedimentation tank and in the opposite direction in response to liquid pressure from said second sedimentation tank, said cylinder being mechanically coupled with said second linkage bar.

7. Apparatus in accordance with claim 5 wherein said pressure sensor comprises a fluid actuated cylinder which travels in one direction in response to liquid pressure from said first sedimentation tank and in the opposite direction in response to liquid pressure from said second sedimentation tank, said cylinder being mechanically coupled with said second linkage element second end.

8. Apparatus in accordance with claim 5 wherein said spring means comprises a first spring mechanically connected to said first linkage bar second end and to a point fixed in space with respect to the rotation of said first linkage bar from said first to said second position, such that said spring is most compressed at the center point of travel of said bar from said first to said second position and a second spring which is a tension spring having one end fixed to said same point in space and a second end to said first end of said second linkage element, said second spring being selected so that the movement of said second linkage element into contact with said first linkage bar corresponds with a predetermined liquid level in said sedimentation tanks.

9. A septic treatment apparatus comprising first and second unitary treatment modules, each module having a sedimentation tank with an inlet for receiving fluids, an outlet for discharging fluids, and a wetland integrated into said module and fluidically coupled to said sedimentation tank, a dosing device, said dosing device having, first, second and third inlet ports and first, second and third outlet ports, said first inlet port being fluidically connected to said first and second outlet ports by separate flexible wall tubes, said second and third inlet ports being fluidically coupled to said third outlet port by means of separate flexible wall tubes, said first outlet port being fluidically coupled to said inlet of a first one of said sedimentation tanks and said second outlet port being fluidically coupled to said inlet of a second one of said sedimentation tanks, said second inlet port being fluidically coupled to the outlet of said first one of said sedimentation tanks and said third inlet port being fluidically coupled to the outlet of said second one of said sedimentation tanks, said first inlet port being adapted for connection to a source of sewage and said third outlet port being adapted for connection to a leaching field, a valve mechanism adapted to move from a first position to a second position and from said second position back to said first position, a liquid level sensor providing an output signal indicative of the liquid level in each of said sedimentation tanks, said valve mechanism moving from said first to said second position when the liquid level in said first one of said sedimentation tanks is not less than a predetermined level, and from said second to said first position when the liquid level in said second one of said sedimentation tanks is not less than a predetermined level, said valve mechanism in said first position providing that said first outlet port is open, said second outlet port is closed, said second inlet port is closed and said third inlet port is open, said valve mechanism in said second position providing that said first outlet port is closed, said second outlet port is open, said second inlet port is open and said third inlet port is closed.

10. A septic treatment apparatus as in claim 9 wherein said valve mechanism includes cams for pinching said flexible wall tubes to close the ports to which said tubes are connected.

11. A septic treatment apparatus in accordance with claim 10 wherein said valve mechanism includes a mechanical switching linkage comprising, a first linkage bar having first and second ends, which bar in a first position substantially simultaneously closes said first outlet port and opens said second outlet port and in a second position substantially simultaneously closes said second outlet port and opens said first outlet port.

* * * * *